United States Patent [19]

Rosin et al.

[11] Patent Number: 4,480,081

[45] Date of Patent: Oct. 30, 1984

[54] ISOCYANATE-REACTIVE COMPOUNDS FROM MODIFIED TDI DISTILLATION RESIDUE INTERMEDIATES AND POLYURETHANES PREPARED THEREFROM

[75] Inventors: Michael L. Rosin, Madison; James M. O'Connor, Clinton; Wilhelm J. Schnabel, Branford; Robert M. Early, North Branford, all of Conn.

[73] Assignee: Olin Corporation, New Haven, Conn.

[21] Appl. No.: 566,921

[22] Filed: Dec. 29, 1983

[51] Int. Cl.$^3$ .............................................. C08G 18/77
[52] U.S. Cl. ...................................................... 528/49
[58] Field of Search ..................................... 528/45–49

[56] References Cited

U.S. PATENT DOCUMENTS

| | | | |
|---|---|---|---|
| 4,000,099 | 12/1976 | Nemoto et al. | 427/340 |
| 4,032,574 | 6/1977 | Keshi et al. | 260/453 AR |
| 4,055,585 | 10/1977 | Okamoto et al. | 260/453 SP |
| 4,143,008 | 3/1979 | Zwolinski et al. | 528/67 |
| 4,174,435 | 11/1979 | Schäfer et al. | 528/70 |
| 4,251,401 | 2/1981 | Reischl | 525/424 |
| 4,251,638 | 2/1981 | Reischl | 521/128 |
| 4,311,800 | 1/1982 | Reischl | 521/109 |
| 4,357,430 | 11/1982 | Van Cleve | 521/128 |

Primary Examiner—Maurice J. Welsh
Attorney, Agent, or Firm—William D. Sabo

[57] ABSTRACT

Isocyanate-reactive compounds are prepared by the reaction of a modified TDI distillation residue intermediate with a polyol. The modified TDI distillation residue intermediate is the reaction product of TDI distillation residue with a monohydroxylic compound. The isocyanate-reactive compounds are useful in polyurethane formulations.

32 Claims, No Drawings

ISOCYANATE-REACTIVE COMPOUNDS FROM MODIFIED TDI DISTILLATION RESIDUE INTERMEDIATES AND POLYURETHANES PREPARED THEREFROM

This invention relates to isocyanate-reactive compounds of modified TDI distillation residue intermediates and polyols. The invention further relates to the use of these isocyanate-reactive compounds in polyurethane formulations.

Toluene diisocyanate is produced on a large commercial scale by a process which comprises reacting toluene diamine with excess phosgene usually in the presence of an organic solvent medium. An illustrative process is disclosed in U.S. Pat. No. 3,287,387. Along with toluene diisocyanate, the phosgenation product mixture usually comprises unreacted phosgene, solvent, hydrogen chloride by-product, and a relatively substantial proportion of side reaction products in the form of residual and non-distillable materials.

Recovery of a substantial or major proportion of toluene diisocyanate from this mixture is achieved by distillation which is usually effected in two or more steps to enable removal of the low-boiling components, e.g., the phosgene and solvent, first before recovering the toluene diisocyanate. The remaining residue from distillation is a solid or viscous mixture which is often discarded.

In an effort to recycle and productively use the toluene diisocyanate distillation residue, a number of processes have been developed in the art. For example, processes have been proposed for using TDI distillation residue as a binder in the manufacture of lignocellulosic composite materials, such as particle board. Reference is made to U.S. Pat. Nos. 4,143,008 and 4,293,456. It has also been taught that TDI distillation residue can be used in the production of polyurethane compositions. According to U.S. Pat. No. 4,311,800, treated TDI distillation residues are reacted with dihydric and/or trihydric alcohols to form isocyanate-reactive compounds. However, this process involves an initial treatment step in which the distillation residue is denatured with water, thus adding to the expense of preparing usable compounds from the distillation residue.

Another approach involves preparing a dispersion from powdered TDI distillation residue and a polyhydroxyl compound. See U.S. Pat. No. 4,251,401. Like the technique disclosed in U.S. Pat. No. 4,311,800, however, pre-treatment of the TDI distillation residue is required, except that here fine grinding of the residue is carried out. Other patents which show the state of the art are U.S. Pat. Nos. 4,032,574 and 4,055,585.

For a variety of reasons, none of these techniques has proven to be entirely satisfactory.

Now an improved isocyanate-reactive compound has been developed which can be prepared by reacting a modified TDI distillation residue intermediate with a polyol. In forming the modified TDI distillation residue intermediate, TDI distillation residue is reacted with a monohydroxylic compound. It is a particular feature of the invention that the residue, as resulting from the distillation of the product of phosgenating toluene diamine to the corresponding toluene diisocyanate, can be used directly without initial denaturing or fine grinding treatment. The isocyanate-reactive compounds are relatively inexpensive and readily prepared, and are derived by using a material which is generally disposed of as waste. They can be used in preparing a wide variety of polyurethane products, such as foams, in particular rigid foams, and elastomers.

The modified TDI distillation residue intermediate that is utilized according to the invention is prepared by reacting TDI distillation residue with a monohydroxylic compound in an equivalent ratio of OH/NCO from about 0.2/1 to about 0.9/1. Preferably, the OH/NCO ratio ranges from about 0.6/1 to about 0.9/1. It has been found that this initial step of the process results in a reduction in the functionality of the TDI distillation residue. Accordingly, in reacting the modified TDI distillation residue with the polyol, there is a decreased degree of cross-linking, thereby leading to the production of a stable, low-viscosity reaction product.

In forming the modified TDI distillation residue intermediate, any residue may be used resulting from the distillation of the product of phosgenating toluene diamine. As commonly used in the commercial production of toluene diisocyanate, the toluene diamine is typically made up of a mixture of 2,4- and 2,6-isomers and may in addition contain a minor proportion of ortho-toluene diamine. The distillation residue is usually a dark, viscous liquid which is substantially free of solvent. Along with minor amounts of phosgene, by-product hydrochloric acid, and a residual content, of at least about 30% and up to about 70% by weight of toluene diisocyanate, it usually contains a substantial amount, e.g., 30–70% by weight, of non-distillable and tarry by-products of the phosgenation reaction.

Any suitable monohydroxylic compound having a molecular weight of about 32 to about 500 may be used in the modified TDI distillation residue formation. Preferably, the monohydroxylic compound has a molecular weight of about 32 to about 150. Suitable monohydroxylic compounds include the following and mixtures thereof: lower aliphatic alcohols containing about 1–18 carbon atoms such as methanol, ethanol, isopropanol, butanol, amyl alcohol, hexyl alcohol, octanol, decyl alcohol, tribromoneopentyl alcohol, methacylol alcohol, 2-hydroxyethyl acrylate, 2-hydroxyethyl methacrylate, 2-hydroxypropyl acrylate, 2-hydroxypropyl methacrylate, allyl alcohol, vinyl alcohol, ethoxyethanol, and the like; alkyl ethers of ethylene glycol, diethylene glycol, triethylene glycol, propylene glycol, dipropylene glycol, tripropylene glycol, etc. such as ethylene glycol monomethyl ether, ethylene glycol monoethyl ether, propylene glycol monomethyl ether, and the like; cyclic alkanols such as cyclopentanol, cyclohexanol, methylcyclohexanol, cycloheptanol, cyclooctanol, and the like; and araliphatic alcohols such as benzyl alcohol, phenylethanol, 3-phenylpropanol, and the like. Preferred monohydroxylic compounds include lower aliphatic alcohols containing about 1–4 carbon atoms. In accordance with a particularly preferred embodiment of the invention, methanol is employed as the monohydroxylic compound.

Preferably, the reaction between the TDI distillation residue and the monohydroxylic compound is carried out in the presence of a suitable organic solvent. A wide range of solvents may be employed and, in fact, any inert organic solvent in which the reactants are relatively soluble can be used. Useful solvents include, for example, monochlorobenzene, o-dichlorobenzene, p-dichlorobenzene, tetrahydronaphthalene, benzene, toluene, xylene, the chlorotoluenes, the trichlorobenzenes, carbon tetrachloride, trichloroethylene, etc. Common urethane catalysts, e.g., tertiary amines and metal compounds such as stannous octoate, dibutyltin dilaurate or dibutyl (lauryl mercapto) tin, may be used to accelerate the reaction. The reaction temperature and time will both depend upon many factors including the exact reactants being employed. Generally, the temperature should be below the boiling point of the monohydroxylic compound which is utilized.

To form the isocyanate-reactive compound of the invention, the modified TDI distillation residue intermediate is then reacted with a polyol. The polyol reactant that is employed according to the invention includes polyether polyols and polyester polyols and mixtures of two or more such compounds. The polyol, or mixture of polyols, preferably should have a molecular weight from about 62 to about 7,000. The average functionality of the polyol or polyol blend is usually about 2 to about 8, and preferably from about 2 to about 4.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic, and the like, and mixtures thereof. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, 2-methyl glucoside, and the like, and mixtures thereof.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth.

The polyhydric initiator used in preparing the polyether polyol reactant includes the following and mixtures thereof: (a) aliphatic diols, such as ethylene glycol, 1,3-propylene glycol, 1,2-propylene glycol, butylene glycols, butane diols, pentane diols, and the like; (b) aliphatic triols, such as glycerol, trimethylolpropane, triethylolpropane, trimethylolhexane, and the like; (c) higher functionality alcohols, such as sorbitol, pentaerythritol, methyl glucoside, and the like; (d) polyamines, such as tetraethylene diamine; and (e) alkanolamines, such as diethanolamine, triethanolamine, and the like.

A preferred group of polyhydric initiators for use in preparing the polyether polyol reactant is one which comprises aliphatic diols and triols such as ethylene glycol, propylene glycol, dipropylene glycol, glycerol, trimethylolpropane, and the like.

In preparing the polyether polyol, the oxyalkylation reaction is allowed to proceed until the desired molecular weight is reached, at which time the reaction is terminated and the resulting polyol is recovered. As noted above, the molecular weight of the resulting polyol preferably ranges from about 62 to about 7,000; more preferably, the polyether polyol has a molecular weight of about 106–3,000.

A particularly preferred group of polyols includes diethylene glycol, triethylene glycol, tetraethylene glycol and mixtures thereof.

The reaction between the modified TDI distillation residue intermediate and the polyol is carried out employing such relative proportions of the reactants so as to achieve a reaction product having an OH-number (mg KOH/g) of about 200 to about 700. Preferably, the reaction product has an OH-number (mg KOH/g) of about 250 to about 500. Although a catalyst is not necessary, conventional urethane catalysts may be utilized, if desired. The actual reaction conditions such as temperature and time may vary over wide ranges. Generally, a reaction temperature is employed so as to insure a completion of the reaction, and the reaction time varies considerably depending generally on the temperature and other reaction conditions. The desired product may be recovered by any conventional means, such as, for example, distillation, extraction or the like.

The resulting isocyanate-reactive compounds of the present invention may then be employed in the preparation of polyurethane products in accordance with techniques well known to those skilled in the art. Properties can be varied to form polyurethane products such as elastomers and foams.

The polyurethane products are prepared by reacting any suitable combination of an organic polyisocyanate, an isocyanate-reactive compound of the invention and optionally an additional compound reactive with the organic polyisocyanate, in the presence of a catalyst for the reaction. When the polyurethane to be produced is a foam, the reaction mixture further includes a foaming agent and usually a foam stabilizing agent. In the preparation of the polyurethane compositions, either of the general polyurethane forming processes, the "one-shot" or the "prepolymer" processes, may be utilized.

In preparing the polyurethane products of the invention, any suitable organic polyisocyanate, or mixture of polyisocyanates, may be used including toluene diisocyanate, such as the 80:20 and the 65:35 mixtures of the 2,4- and 2,6-isomeric forms, ethylene diisocyanate, propylene diisocyanate, methylene-bis(4-phenyl isocyanate), methylene-bis (4-cyclohexyl) isocyanate, xylene diisocyanate, 3,3'-bitoluene-4,4'-diisocyanate, hexamethylene diisocyanate, napthalene 1,5-diisocyanate, isophorone diisocyanate, the polymeric isocyanates such as polyphenylene polymethylene isocyanate, and the like and mixtures thereof. Preferred embodiments of the invention employ toluene diisocyanate, polyphenylene polymethylene isocyanate and mixtures thereof. In practice, the organic polyisocyanate is usually used in a proportion to provide no more than about 1.25 NCO groups per each hydroxy group, although greater amounts may also be employed. For example, the organic polyisocyanate may be used in such a proportion as to provide more than 2 NCO groups per each hydroxy group in the preparation of polyurethane-polyisocyanurate foams. A 100 multiple of the ratio of NCO to OH groups in the reaction system is referred to as the "index".

Under some circumstances, it may be preferred to include an additional compound reactive with the organic polyisocyanate in the polyurethane-forming reaction mixture. To facilitate handling, the additional compound may be added to the isocyanate-reactive compound prior to its inclusion in the polyurethane formulation. When so employed, the additional compound may be any of the polyols set forth above as being useful in the preparation of the isocyanate-reactive compound. The amount of additional compound included in the reaction mixture may vary over a wide range depending upon the properties sought in the polyurethane product. However, when used, the additional compound is generally added in a proportion ranging from about 1-75 parts per 100 parts by weight of the total compounds reactive with the organic polyisocyanate.

The catalyst employed in preparing the polyurethane compositions of the invention may be any of the catalysts known to be useful for this purpose. Depending upon the type of product desired, the catalyst may include, for example, a tertiary amine, an organo-metallic salt, a mixture of an organo-metallic salt with one or more tertiary amine, etc. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethylcyclohexylamine, methyldiethanolamine, mixtures of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33LV", and "Dabco 8020", respectively, bis(dimethylaminopropylether) and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1-3.0, and preferably about 0.25-1.5, parts per 100 parts by weight of the total compounds reactive with the organic polyisocyanate.

Typical organo-metallic salts include, for example, the salts of potassium, tin, mercury, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodecanoates of these metals, the octoates being preferred. The organo-metallic salt catalyst is generally used in a proportion of about 0-5.0, and preferably about 0.01-3.0, parts per 100 parts by weight of the total compounds reactive with the organic polyisocyanate.

Other catalysts suitable for use in preparing polyurethane-polyisocyanurate foams include, for example, the following and mixtures thereof: alkali and alkaline earth metal oxides, carbonates, alkoholates, phenolates, and salts of weak carbonic acids, such as sodium methoxide, sodium acetate, potassium acetate, sodium phenolate, sodium 2-ethylhexoate, and the like; quaternary hydroxides derived from nitrogen or phosphorus, such as tetraethylammonium hydroxide, benzyl-triethylammonium hydroxide, tetraethylphosphonium hydroxide, and the like; hexahydrotriazine derivatives, such as N,N',N''-tris-(3-dimethylaminopropyl)sym-hexahydrotriazine, and the like; and aminophenol derivatives, such as o-dimethylaminophenol, p-dimethylaminophenol, 2,4,6-tris(dimethylaminomethyl)phenol, and the like. Such catalysts are usually used in a proportion of about 0.01-10, and preferably about 0.1-5.0, parts per 100 parts by weight of the organic polyisocyanate.

When the product being formed is a polyurethane foam, this may be accomplished by employing a small amount of a conventional polyurethane foaming agent. Any suitable foaming agent, or mixture of foaming agents, may be employed. These include inorganic foaming agents, such as water, and organic foaming agents containing up to 7 carbon atoms, such as the halogenated hydrocarbons and the low molecular weight alkanes, alkenes and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane, dichlorodifluoromethane and methylene chloride, are preferred. The amount of foaming agent can be varied over a wide range, as is known to those skilled in the art. Generally, however, the halogenated alkanes, for example, are employed in an amount of about 2-60 parts per 100 parts by weight of the total compounds reactive with the organic polyisocyanate; and water is employed in an amount of about 1-6 parts per 100 parts by weight of the total compounds reactive with the organic polyisocyanate.

It is preferred in the preparation of the polyurethane foams of the invention to employ minor amounts of a conventional surfactant in order to further improve the cell structure of the polyurethane foam. Suitable such surfactants include, for example, the silicon-based surfactants such as the silicones and the siloxane-oxyalkylene block copolymers, all of which are commercially available materials. Generally, the silicones are employed in a proportion of up to about 0.1 parts, and the siloxane-oxyalkylene block copolymers are employed in a proportion of up to about 3 parts, both proportions being based on 100 parts by weight of the total compounds reactive with the organic polyisocyanate.

The polyurethane formulations may also include various other additives and ingredients known to those skilled in the art. For example, to provide different properties in the polyurethane foam products, fillers such as clay, calcium sulfate or ammonium phosphate may be added to lower cost and improve physical properties. Ingredients such as dyes may be added for color, and fibrous glass, asbestos or synthetic fibers may be added for strength. In addition, plasticizers, deodorants, antioxidants and flame retardants may be added.

The following examples are provided to illustrate the invention. The toluene diisocyanate distillation residue which is referred to and used throughout the examples was obtained by a conventional method, as described, for example, in U.S. Pat. No. 3,287,387, for the commercial production of toluene diisocyanate. More specifically, this method involves (a) reacting, at about 125° C., excess phosgene with a solution of toluene diamine (mixture of 2,4- and 2,6-isomers) in monochlorobenzene solvent, (b) removing the monochlorobenzene, and most of the unreacted phosgene and by-product HCl from the phosgenation product, and (c) further distilling the remaining product to recover overhead pure toluene diisocyanate. The residue from this distillation, which contains about 50% to about 70% by weight of residual toluene diisocyanate, is used in the examples.

Further in the examples, all parts and percentages are by weight unless otherwise specified.

COMPARATIVE EXAMPLE A

418 Grams of diethylene glycol were weighed into a one liter reaction flask, equipped with stirrer, reflux condenser, dropping funnel, and gas inlet tube and were heated to 60° C. 450 Grams of an orthodichlorobenzene solution, containing 50% by weight (225 grams) of TDI distillation residue, were added slowly over two hours. The rate of the addition was adjusted to maintain a temperature of 65°–70° C., and the reaction mixture was heated to 100° C. for one hour. The solvent was evaporated by vacuum distillation giving 643 grams of a clear reaction product, containing 35% by weight of TDI distillation residue and having a viscosity of 78,000 cps at 23° C. The OH-number was found to be 542 (calculated: 545).

EXAMPLE 1

The procedure of Comparative Example A was followed, except that 42.5 grams of methanol were added to the orthodichlorobenzene solution prior to the addition to diethylene glycol. The methanol was added slowly over two hours to control the exotherm, while maintaining the temperature at 60° C. or less. This quantity of methanol was used so as to react 80% of the NCO groups present in the TDI distillation residue, which had an NCO content of 31%. After removing the solvent by vacuum distillation, the final product, containing about 34% TDI distillation residue (calculated as unmodified residue), had a viscosity of only 3,400 cps at 22° C., as compared to 78,000 cps at 23° C. obtained according to Comparative Example A. The results show that the modification of the TDI distillation residue with methanol achieved a substantial reduction in the viscosity of the final product.

EXAMPLE 2

631 Grams of TDI distillation residue (33.8% NCO) were dissolved in an equal amount of monochlorobenzene. To this solution were added slowly within two hours 130 grams of methanol so as to convert 80% of the NCO groups to the corresponding carbamate. The resulting mixture was then added to 816.5 grams of diethylene glycol in a three liter reaction flask. The reaction mixture was heated for two hours at 60° C. After removing the solvent by vacuum distillation, the final product, containing 40% TDI distillation residue, had a viscosity of 9,280 cps at 24° C. The OH-number was analyzed to be 505 (calculated: 512).

EXAMPLE 3

A. 403 Grams of TDI distillation residue, containing about 54% of residual toluene diisocyanate, was diluted with 215 grams of toluene diisocyanate, then dissolved in 618 grams of monochlorobenzene. To this solution were added 146 grams of methanol so as to react 80% of the available NCO groups. After reaction with diethylene glycol—in accordance with the procedure of Example 1—and evaporation of the solvent, the final product, containing 45% of the diluted TDI distillation residue, had a viscosity of 21,000 cps at 24° C.

B. An analogous reaction, as described under Example 3 (A), was carried out. Instead of methanol, however, the diluted TDI distillation residue was reacted with a mixture of methanol/isopropanol (weight ratio: 70/30) to convert 80% of the NCO groups to the corresponding carbamates. The final liquid product had a viscosity of 21,800 cps at 24° C.

EXAMPLE 4

241 Pounds of TDI distillation residue (60% of residual toluene diisocyanate), were charged to a pilot plant reactor under a blanket of dry nitrogen and admixed with 241 pounds of monochlorobenzene. 50 Pounds of methanol were added slowly to the agitated solution to control the exothermic reaction, while maintaining the temperature at 60° C. or less. After addition of the methanol, the slightly agitated mixture was heated for three hours at 60° C. and the 293 pounds of diethylene glycol were added. To complete the reaction, the resulting mixture was heated for four hours at 60° C. After evaporation of the solvent by vacuum distillation, the final product, containing 42% TDI distillation residue, had a viscosity of 10,200 cps at 24° C. The OH-number was found to be 484 (calculated: 483).

EXAMPLE 5

A rigid polyurethane foam was prepared from the following ingredients in the following proportions:

| Ingredient | Amount (Parts by Weight) |
| --- | --- |
| Polyether Polyol[1] | 60 |
| Isocyanate-Reactive Compound (Example 4) | 40 |
| Flame Retardant Additive[2] | 9.4 |
| Foaming Agent[3] | 53 |
| Surfactant[4] | 2.3 |
| Diethylene Glycol | 2.1 |
| Catalyst[5] | 0.5 |
| Catalyst[6] | 2.5 |
| Polyphenylene Polymethylene Isocyanate[7] | 242 |
| (NCO/OH) | (220 index)[8] |

[1]This is a polyether polyol having a molecular weight of about 420 and prepared by oxypropylating methyl glucoside to a final hydroxyl number of about 440.
[2]This is beta-chloropropyl phosphate ester and is commercially available from Mobil Chemical Company under the designation "Antiblaze-80".
[3]This is monofluorotrichloromethane and is commercially available from E. I. duPont de Nemours & Co. under the designation "Freon R-11".
[4]This is a silicone-glycol copolymer and is commercially available from Dow Corning under the designation "DC-193".
[5]This is a tertiary amine and is commercially available from Abbott Laboratories under the designation "Polycat-8".
[6]This is a potassium octoate and is commercially available from M&T Chemicals, Inc. under the designation "T-45".
[7]This is a commercial product of the Upjohn Company purchased under the designation "PAPI-135" and having an approximate functionality of 2.7.
[8]The proportion of isocyanate was calculated to provide in the example an index of 220.

All of the above ingredients, with the exception of the isocyanate, were added to a paper cup and mixed for 15–30 seconds. The isocyanate was then added; and the ingredients were mixed at 2,000–3,000 rpm for 10 seconds, and then allowed to foam in a mold (4'×1'×4"). The physical properties of the resulting rigid polyurethane foam are tabulated in Table I below.

TABLE I

| Property | Test Method | Result |
| --- | --- | --- |
| Density, core (p.c.f.) | ASTM-D-1622-63 | 1.84 |
| Compressive Strength (p.s.i.) | | |
| Parallel to Rise | ASTM-D-1621-73, Procedure A | 32.9 |
| Perpendicular to Rise | ASTM-D-1621-73, Procedure A | 17.2 |
| "K" Factor, initial (BTU/hr./ft.$^2$/°F./in.) | ASTM-C-518-76 | 0.153 |
| Porosity (% closed cells) | ASTM-D-2856-70 | 93.6 |
| Friability (% weight loss/10 mins.) | ASTM-C-421-71 | 43 |
| Humid Age Test (% change in volume, 14 days) | ASTM-D-2126-75 | |
| 158° F. and ambient | | 1.01 |

TABLE I-continued

| Property | Test Method | Result |
|---|---|---|
| relative humidity | | |
| 158° F. and 100% relative humdity | | 4.92 |
| 200° F. and ambient relative humidity | | 0.51 |
| Flammability | 4' Tunnel Test | |
| Flame spread (in.) | | 20, 19 |
| Smoke (in.²) | | 10.75, 9.18, 8.07 |

The test results show that the foam simulates a UL (Underwriters Laboratories) Class II flammability rating.

EXAMPLES 6–11

Additional isocyanate-reactive compounds were prepared according to the procedure of Example 2. However, instead of diethylene glycol, either triethylene glycol or tetraethylene glycol was used. The results are outlined in Table II below.

TABLE II

| Example No. | Polyol Employed | % TDI Distillation Residue | Viscosity (cps @ 24° C.) | OH-Number |
|---|---|---|---|---|
| 6 | Triethylene glycol | 42 | 37,000 | 327 |
| 7 | Triethylene glycol | 40 | 23,000 | 347 |
| 8 | Triethylene glycol | 38 | 14,000 | 367 |
| 9 | Tetraethylene glycol | 42 | 85,000 | 244 |
| 10 | Tetraethylene glycol | 40 | 45,000 | 258 |
| 11 | Tetraethylene glycol | 38 | 24,000 | 276 |

EXAMPLE 12

The procedure of Example 2 was repeated, except that instead of diethylene glycol, a mixture of diethylene glycol (two parts) and a trifunctional polyol[1] (one part) was used. The polyol product, containing 38% TDI distillation residue, had a viscosity of 10,800 cps at 24° C. and an OH-number of 453.

[1] This is a polyether polyol having a molecular weight of about 280 and prepared by oxyethylating diethanolamine to a final hydroxyl number of about 600.

EXAMPLE 13

The procedure of Example 2 was repeated, except that instead of diethylene glycol, a mixture of about equal parts of diethylene glycol and a polyether polyol[2] was used. The final product, containing 35% TDI distillation residue, had a viscosity of 90,000 cps at 24° C. and an OH-number of 335.

[2] This is a polyether polyol having a molecular weight of about 830 and prepared by end-capping a propoxylated methyl glucoside precursor with ethylene oxide.

EXAMPLE 14

10.5 Parts of a trifunctional polyol[1] were added to 100 parts of the isocyanate-reactive compound obtained according to Example 6. The resulting mixture, containing 38% TDI distillation residue, had a viscosity of 17,200 cps at 24° C. and OH-number of 353.

[1] This is a polyether polyol having a molecular weight of about 280 and prepared by oxyethylating diethanolamine to a final hydroxyl number of about 600.

EXAMPLE 15

10.5 Parts of a polyol[2] were added to 100 parts of the isocyanate-reactive compound obtained according to Example 6. The resulting mixture, containing 38% TDI distillation residue, had a viscosity of 25,600 cps at 24° C. and an OH-number of 319.

[2] This is a polyether polyol having a molecular weight of about 830 and prepared by end-capping a propoxylated methyl glucoside precursor with ethylene oxide.

What is claimed is:

1. A process for preparing an isocyanate-reactive compound, comprising the steps of:
   (a) reacting TDI distillation residue with a monohydroxylic compound in an equivalent ratio of OH to NCO ranging from about 0.2/1 to about 0.9/1 to form a modified TDI distillation residue intermediate, said TDI distillation residue being obtained from the distillation of the product of phosgenating toluene diamine to the corresponding toluene diisocyanate, and then
   (b) reacting said modified TDI distillation residue intermediate with a polyol in such proportions as to obtain a reaction product having an OH-number (mg KOH/g) of about 200 to about 700.

2. The process of claim 1, wherein said TDI distillation residue and said monohydroxylic compound are employed in an equivalent ratio of OH to NCO ranging from about 0.6/1 to about 0.9/1.

3. The process of claim 1, wherein said modified TDI distillation residue intermediate and said polyol are employed in such proportions as to obtain a reaction product having an OH-number (mg KOH/g) of about 250 to about 500.

4. The process of claim 1, wherein said reaction between said TDI distillation residue and said monohydroxylic compound is carried out in the presence of an organic solvent.

5. The process of claim 1, wherein said TDI distillation residue has a toluene diisocyanate content of about 30% to about 70% by weight.

6. The process of claim 1, wherein said monohydroxylic compound has a molecular weight of about 32 to about 150.

7. The process of claim 1, wherein said polyol has a molecular weight of about 106 to about 3,000.

8. A process for preparing an isocyanate-reactive compound, comprising the steps of:
   (a) reacting TDI distillation residue with a monohydroxylic compound in an equivalent ratio of OH to NCO ranging from about 0.6/1 to about 0.9/1 to form a modified TDI distillation residue intermediate, said TDI distillation residue being obtained from the distillation of the product of phosgenating toluene diamine to the corresponding toluene diisocyanate and having a toluene diisocyanate content of about 30% to about 70% by weight, and wherein said reaction is carried out in the presence of an organic solvent, and then
   (b) reacting said modified TDI distillation residue intermediate with a polyol in such proportions as to obtain a reaction product having an OH-number (mg KOH/g) of about 250 to about 500.

9. The process of claim 8, wherein said monohydroxylic compound has a molecular weight of about 32 to about 150.

10. The process of claim 9, wherein said polyol has a molecular weight of about 106 to about 3,000.

11. The process of claim 10, wherein said monohydroxylic compound is methanol and said polyol is selected from the group consisting of diethylene glycol, triethylene glycol and teteraethylene glycol.

12. An isocyanate-reactive compound prepared according to the process of claim 1.

13. An isocyanate-reactive compound prepared according to the process of claim 8.

14. An isocyanate-reactive compound prepared according to the process of claim 11.

15. A process for preparing a polyurethane foam from a reaction mixture which comprises an organic polyisocyanate, a foaming agent, a reaction catalyst, an isocyanate-reactive compound prepared by
   (a) reacting TDI distillation residue with a monohydroxylic compound in an equivalent ratio of OH to NCO ranging from about 0.2/1 to about 0.9/1 to form a modified TDI distillation residue intermediate, said TDI distillation residue being obtained from the distillation of the product of phosgenating toluene diamine to the corresponding toluene diisocyanate; and then
   (b) reacting said modified TDI distillation residue intermediate with a polyol in such proportions as to obtain a reaction product having an OH-number (mg KOH/g) of about 200 to about 700; and, optionally, an additional compound reactive with said organic polyisocyanate.

16. The process of claim 15, wherein said TDI distillation residue and said monohydroxylic compound are employed in an equivalent ratio of OH to NCO ranging from about 0.6/1 to about 0.9/1.

17. The process of claim 15, wherein said modified TDI distillation residue intermediate and said polyol are employed in such proportions as to obtain a reaction product having an OH-number (mg KOH/g) of about 250 to about 500.

18. The process of claim 15, wherein said reaction between said TDI distillation residue and said monohydroxylic compound is carried out in the presence of an organic solvent.

19. The process of claim 15, wherein said TDI distillation residue has a toluene diisocyanate content of about 30% to about 70% by weight.

20. The process of claim 15, wherein said monohydroxylic compound has a molecular weight of about 32 to about 150.

21. The process of claim 15, wherein said polyol has a molecular weight of about 106 to about 3,000.

22. A process for preparing a polyurethane foam from a reaction mixture which comprises an organic polyisocyanate, a foaming agent, a reaction catalyst, an isocyanate-reactive compound prepared by
   (a) reacting TDI distillation residue with a monohydroxylic compound in an equivalent ratio of OH to NCO ranging from about 0.6/1 to about 0.9/1 to form a modified TDI distillation residue intermediate, said TDI distillation residue being obtained from the distillation of the product of phosgenating toluene diamine to the corresponding toluene diisocyanate and having a toluene diisocyanate content of about 30% to about 70% by weight, and wherein said reaction is carried out in the presence of an organic solvent; and then
   (b) reacting said modified TDI distillation residue intermediate with a polyol in such proportions as to obtain a reaction product having an OH-number (mg KOH/g) of about 250 to about 500; and, optionally, an additional compound reactive with said organic polyisocyanate.

23. The process of claim 22, wherein said monohydroxylic compound has a molecular weight of about 32 to about 150.

24. The process of claim 23, wherein said polyol has a molecular weight of about 106 to about 3,000.

25. The process of claim 24, wherein said monohydroxylic compound is methanol and said polyol is selected from the group consisting of diethylene glycol, triethylene glycol and tetraethylene glycol.

26. A polyurethane foam prepared according to the process of claim 15.

27. A polyurethane foam prepared according to the process of claim 22.

28. A polyurethane foam prepared according to the process of claim 25.

29. A process for preparing a polyurethane composition from a reaction mixture which comprises an organic polyisocyanate, a reaction catalyst, an isocyanate-reactive compound prepared by
   (a) reacting TDI distillation residue with a monohydroxylic compound in an equivalent ratio of OH to NCO ranging from about 0.2/1 to about 0.9/1 to form a modified TDI distillation residue intermediate, said TDI distillation residue being obtained from the distillation of the product of phosgenating toluene diamine to the corresponding toluene diisocyanate; and then
   (b) reacting said modified TDI distillation residue intermediate with a polyol in such proportions as to obtain a reaction product having an OH-number (mg KOH/g) of about 200 to about 700; and, optionally, an additional compound reactive with said organic polyisocyanate.

30. A process for preparing a polyurethane composition from a reaction mixture which comprises an organic polyisocyanate, a reaction catalyst, an isocyanate-reactive compound prepared by
   (a) reacting TDI distillation residue with a monohydroxylic compound in an equivalent ratio of OH to NCO ranging from about 0.6/1 to about 0.9/1 to form a modified TDI distillation residue intermediate, said TDI distillation residue being obtained from the distillation of the product of phosgenating toluene diamine to the corresponding toluene diisocyanate and having a toluene diisocyanate content of about 30% to about 70% by weight, and wherein said reaction is carried out in the presence of an organic solvent; and then
   (b) reacting said modified TDI distillation residue intermediate with a polyol in such proportions as to obtain a reaction product having an OH-number (mg KOH/g) of about 250 to about 500; and, optionally, an additional compound reactive with said organic polyisocyanate.

31. A polyurethane composition prepared according to the process of claim 29.

32. A polyurethane composition prepared according to the process of claim 30.

* * * * *